(12) United States Patent
Le Quere

(10) Patent No.: US 8,672,365 B2
(45) Date of Patent: Mar. 18, 2014

(54) QUICK CONNECT COUPLING HAVING INVERTED GUIDE AND SEALING ZONES

(71) Applicant: Parker-Hannifin Corporation, Cleveland, OH (US)

(72) Inventor: Philippe Le Quere, Betton (FR)

(73) Assignee: Parker Hannifin Manufacturing France SAS, Ville-la-Grand (FR)

( * ) Notice: Subject to any disclaimer, the term of this patent is extended or adjusted under 35 U.S.C. 154(b) by 0 days.

(21) Appl. No.: 13/688,691

(22) Filed: Nov. 29, 2012

(65) Prior Publication Data

US 2013/0099485 A1  Apr. 25, 2013

Related U.S. Application Data

(63) Continuation of application No. 12/896,592, filed on Oct. 1, 2010, now abandoned.

(51) Int. Cl.
*F16L 21/06* (2006.01)

(52) U.S. Cl.
USPC .......................................... 285/322; 285/323

(58) Field of Classification Search
USPC ......... 285/322, 323, 324, 374, 377, 376, 340, 285/345, 305
See application file for complete search history.

(56) References Cited

U.S. PATENT DOCUMENTS

| | | |
|---|---|---|
| 4,643,466 A | 2/1987 | Conner |
| 4,946,213 A | 8/1990 | Guest |
| 5,370,423 A | 12/1994 | Guest |
| 5,511,830 A | 4/1996 | Olson et al. |
| 5,865,996 A | 2/1999 | Reid |
| 6,056,326 A | 5/2000 | Guest |
| 6,302,451 B1 | 10/2001 | Olson |
| 6,843,512 B2 | 1/2005 | Fritze et al. |
| 6,880,865 B2 | 4/2005 | Guest |
| 7,354,079 B2 | 4/2008 | Rehder et al. |
| 7,410,193 B2 | 8/2008 | Guest |
| 7,425,022 B2 | 9/2008 | Guest |
| 7,434,847 B2 | 10/2008 | Densel et al. |
| 7,543,858 B1 | 6/2009 | Wang |
| 7,644,959 B2 | 1/2010 | Guest |

FOREIGN PATENT DOCUMENTS

| | | |
|---|---|---|
| EP | 1701080 A1 | 9/2006 |
| FR | 2923888 A1 | 5/2009 |
| GB | 1222289 A1 | 2/1971 |
| WO | 00/36327 A1 | 6/2000 |
| WO | 03/054434 A1 | 7/2003 |

*Primary Examiner* — David E Bochna
(74) *Attorney, Agent, or Firm* — John A. Molnar

(57) ABSTRACT

A coupling device including a tubular body defining a channel having a reception segment for receiving a pipe end, the reception segment being provided with a locking member for locking the pipe end in the reception segment, a sealing member for fitting tightly against an outside surface of the pipe end, a guide for guiding the pipe end in the reception segment, and an abutment for stopping the pipe end being pushed into the reception segment, wherein the sealing member is placed in a groove formed between the abutment and the guide, and the locking member is placed between the guide and an inlet to the reception segment.

26 Claims, 2 Drawing Sheets

QUICK CONNECT COUPLING HAVING INVERTED GUIDE AND SEALING ZONES

CROSS-REFERENCE TO RELATED APPLICATIONS

This application is a continuation of U.S. patent application Ser. No. 12/896,592, filed Oct. 1, 2010, which is a continuation of and claims priority to French Application No. 09 04761, filed Oct. 6, 2009, the disclosure of each of which applications is expressly incorporated herein by reference.

BACKGROUND OF THE INVENTION

The present invention relates to a coupling device, more particularly of the quick-connect type, arranged to enable one end of a duct to be connected to an element of a fluid transport circuit, which element may be an element that emits or receives fluid, and in particular a pipe, a manifold, a member for regulating flow rate or pressure, an actuator, a tank, a pump, or the like.

Such a coupling device is shown in FIG. 6 and generally comprises a tubular body 1 defining a channel 2 including a segment 3 for receiving a pipe end 100 (FIG. 3). In succession in a direction for inserting the pipe end 100 in the reception segment 3, the reception segment comprises: a locking member 4 for locking the pipe end 100 in the reception segment 3; a sealing member 5 for fitting tightly around an outside surface of the pipe end; a guide surface 6 for guiding the pipe end in the reception segment; and an abutment 7 for stopping the pipe end being pushed into the reception segment. By way of example, the locking member 5 is a clamp, as shown in FIG. 6, comprising a sleeve having one end subdivided into arms that are elastically deformable between a state for releasing the pipe end and a state for locking the pipe end. The clamp is movable axially in the reception segment between a pushed-in, release position in which the arms are in their release state, and a pulled-back locking position in which a surface of the body holds the arms in their state for locking the pipe end. The locking member 4 may also be a washer having an inside circumference subdivided into a plurality of teeth, the washer being deformable between a pipe-end passing state and a pipe-end locking state.

It is known that reversing of the pipe end as a result of traction being applied to the pipe end 100, or as a result of the circuit being pressurized, gives rise to a space (zone A in FIG. 6) between the terminal face of the pipe end 100 and the abutment 7. This space is larger with locking members of the clamp type than with those of the toothed washer type.

It is also known that the fluid tends to stagnate in this space, which constitutes a fluid retention zone. Such a retention zone is more particularly harmful when the fluid being transported is a perishable liquid that might deteriorate in the retention zone and pollute the liquid flowing in the circuit. Other pollutants, such as dirt, may also stagnate in the retention zone.

In order to remedy that drawback, proposals have been made for coupling devices in which the coupling is no longer sealed by the outside surface of the pipe end but via the terminal face thereof. In those coupling devices, the resilience of the sealing member compensates for the reversal of the pipe end, thereby preventing a retention zone being formed. Those coupling devices present the drawback that the abutment of the pipe end is not firm, such that an operator is not certain to have compressed the sealing member sufficiently to guarantee that the coupling remains sealed after reversal of the tube, or indeed that the coupling remains connected.

In fluid installations in which the quality of the fluid is monitored, provision is also made to clean the circuit regularly by causing a cleaning liquid to flow therein.

It is also known from document U.S. Pat. No. 4,643,466 a coupling device without any guiding surface for the pipe. In said coupling device, a ring is mounted in the channel in order to center the pipe in the device. Such a centering is different from a guiding which maintains a segment of the pipe along an axial direction of the channel.

SUMMARY OF THE INVENTION

The invention provides ways for limiting the risks of a transported fluid being polluted by pollutants present in retention zones of a coupling device.

The invention results from an approach that is different from that which has previously been favored. In this approach, that has been verified experimentally, the retention zone A that is usually taken into consideration, and that results from the pipe end reversing, is of dimensions that are large enough to allow fluid to flow even if the fluid flow rate therein is less than the flow rate close to the central axis of the coupling. The fact that such flow is possible enables a cleaning liquid to reach this zone, should that be necessary. In contrast, experiments have shown that the space existing between the outside surface of the pipe end and the guide surface of the body (zone B in FIG. 6) constitutes a retention zone that extends between the retention zone that is usually taken into consideration and the sealing member and that, because of its small dimensions, does not allow fluid to flow and thus cannot be washed by the cleaning fluid.

In accordance with the invention, there is thus proposed a coupling device comprising a tubular body defining a channel having a reception segment for receiving a pipe end, the reception segment being provided with a locking member for locking the pipe end in the reception segment, a sealing member for fitting tightly against an outside surface of the pipe end, guide means for guiding the pipe end in the reception segment, and an abutment for stopping the pipe end being pushed into the reception segment, wherein the sealing member is placed in a groove formed between the abutment and the guide means, and the locking member is placed between the guide means and an inlet to the reception segment. Thus, the position of the gasket makes it possible to prevent fluid reaching the pipe end guide zone, and as a result it cannot constitute a retention zone.

In a particular embodiment, the guide means comprise a bushing fitted in the reception segment and, preferably, the bushing includes a polygonal inside surface defining a passage of section smaller than the outside section of the pipe end, such as a hexagonal polygonal surface. This makes it possible to limit the ability of the pipe end to deform, e.g. towards ovalizing its section, since that might lead to poor contact and thus to leakage between the sealing member and the outside surface of the pipe end.

The bushing may possess a first axial dimension and a second axial dimension respectively in the vicinity of an inside outline and of an outside outline of the bushing, the first axial dimension being longer than the second axial dimension. This makes it possible to improve guidance of the pipe end in the body of the coupling device and to limit any risk of leakage resulting from the pipe end deforming.

The bushing also may include a flank of frustoconical shape beside the locking member, and said locking member is a clamp deformable between a locking state and a release state for the pipe end, and is movable axially between a pushed-in position in which the frustoconically-shaped flank holds the clamp in its release state, and a pulled-back position in which the clamp is held in its locking state by a surface of the body. In addition to its guidance function, the bushing then performs an additional function of assisting insertion and extraction of the pipe end by facilitating deformation of the clamp towards, and indeed beyond, its release state.

Advantageously, the sealing member occupies substantially all of the groove and, for example, the sealing member is of a shape that is complementary to the shape of the groove. The reversal of the pipe end then gives rise to a negligible space being released that does not include a portion remote from the central axis of the coupling such that fluid flow is facilitated therein.

The groove may have diverging flanks. The pressure of the fluid in the circuit then contributes to reinforced sealing by pressing the sealing member against the elements that surround it.

The present invention, accordingly, comprises the construction, combination of elements, and/or arrangement of parts and steps which are exemplified in the detailed disclosure to follow.

BRIEF DESCRIPTION OF THE DRAWINGS

For a fuller understanding of the nature and features of the invention, reference should be had to the following detailed description taken in connection with the accompanying drawings wherein.

The drawings will be described further in connection with the following Detailed Description of the Invention.

DETAILED DESCRIPTION OF THE INVENTION

With reference to the figures, the invention relates to a coupling device comprising a body 1 having a first section that is arranged to receive a pipe end 100 and a second section that is arranged to be connected to a channel of a fluid transport circuit element, which element may be an element for emitting or receiving fluid and in particular a pipe, a manifold, a flow rate or pressure regulator member, an actuator, a tank, a pump, or the like. The second section is itself known and comprises, for example, a threaded portion for engaging in a tapped segment of the channel. The second section does not form part of the subject matter of the invention and is not described in greater detail herein.

Figure 1:
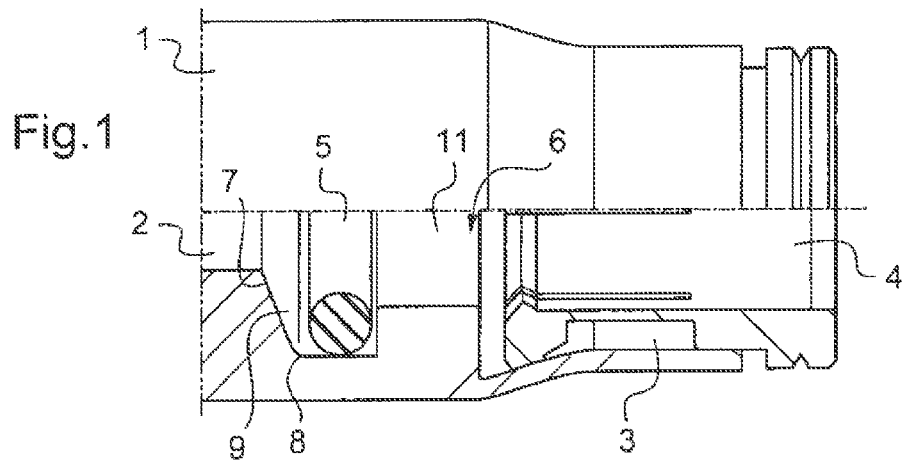
FIG. 1 is a longitudinal half cross-sectional view of a quick-connect coupling in accordance with the present invention.

With reference more particularly to FIG. 1, the body 1 defines a channel 2 that is terminated beside the first section of the body 1 by a segment 3 for receiving the pipe end 100.

The segment 3 is provided with a locking member 4 for locking the pipe end 100 in the segment 3, a sealing member 5 for fitting tightly against an outside surface of the pipe end 100, means given overall reference 6 for guiding the pipe end 100 in the segment 3, and an abutment 7 for stopping the pipe end being pushed into the segment 3.

The guide means 6 in this example are formed by a collar 11 projecting into the segment 3 and having an inside surface, here a cylindrical surface, that serves to guide the pipe end 100.

The locking member 4 is received between the collar 11 of the guide means 6 and the inlet orifice of the segment 3 and is itself known. The locking member 4 in this example comprises a clamp formed by a sleeve having an end portion that is subdivided by axial slots into a plurality of arms, and an opposite end portion that projects outside the body 1. The arms have respective free ends, each provided with a tooth projecting towards the central axis of the sleeve, and the arms are deformable between a locking plate in which the teeth define a through diameter that is smaller than the outside diameter of the pipe end 100, and a release state in which the teeth define a through diameter equal to the outside diameter of the pipe end 100. The free ends of the arms are also provided with respective outwardly-directed bulges for co-operating with a frustoconical wall portion of the segment 3 (this wall portion is generally referred to as a clamping cone), and the locking member 4 is movable:

(i) between a pushed-in release position (close to the collar 11) in which the arms are free to deform between their two states; and (ii) a pulled-back locking position (close to the inlet orifice) in which said frustoconical wall portion holds the arms in their locking position.

The sealing member 5 is located in a groove 8 formed between the abutment 7 and the collar 11 of the guide means 6. In this example the sealing member 5 is made of an elasticall: compressible material in the form of an O-ring having an inside diameter that is smaller than the outside diameter of the pipe end. The groove 8 flares away from its maxim: circumference and possesses a frustoconical flank 9 connecting with the remainder of the channel 2.

In the vicinity of its connection with the channel 2, the frustoconical flank 9 possesses an annular portion of inside diameter smaller than the outside diameter of the pipe end 100, thereby forming the abutment 7.

It can be understood that when the pipe end 100 is inserted in the segment 3, the pipe end 100 pushes the locking member 4 towards its release position and then passes through it. The pipe end 100 then passes into the collar 11 of the guide means 6 and into the sealing member 5 prior to touching the abutment 7.

When the circuit is pressurized, the pipe end 100 reverses, thereby entraining the sealing member against the collar 11 of the guide means 6 and the locking member 4 towards its locking position in such a manner that the arms of the locking member 4 are deformed into their locking state where they clamp onto the pipe end 100.

An operator can disconnect the pipe end 100 by pushing the locking member 4 into its release position while pulling on the pipe end 100.

Elements identical or analogous to those described above are given the same numerical references in the embodiments described below with reference to FIGS. 2 and 5.

Figure 2:
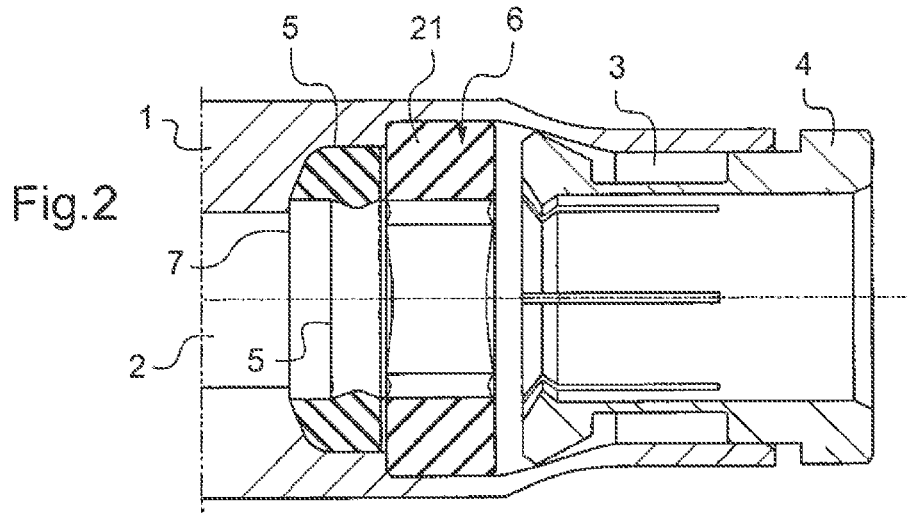
FIG. 2 is a longitudinal cross-sectional view of an alternative embodiment quick-connect coupling in accordance with the present invention.
Figure 3:
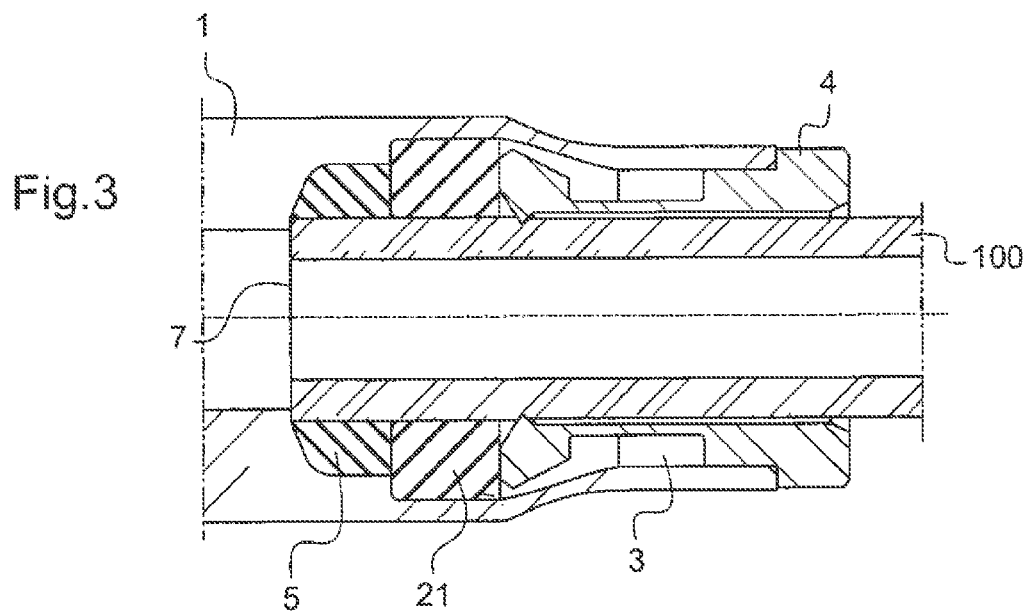
FIG. 3 is longitudinal cross-sectional view showing the coupling of FIG. 2 after insertion of a pipe.
Figure 4:
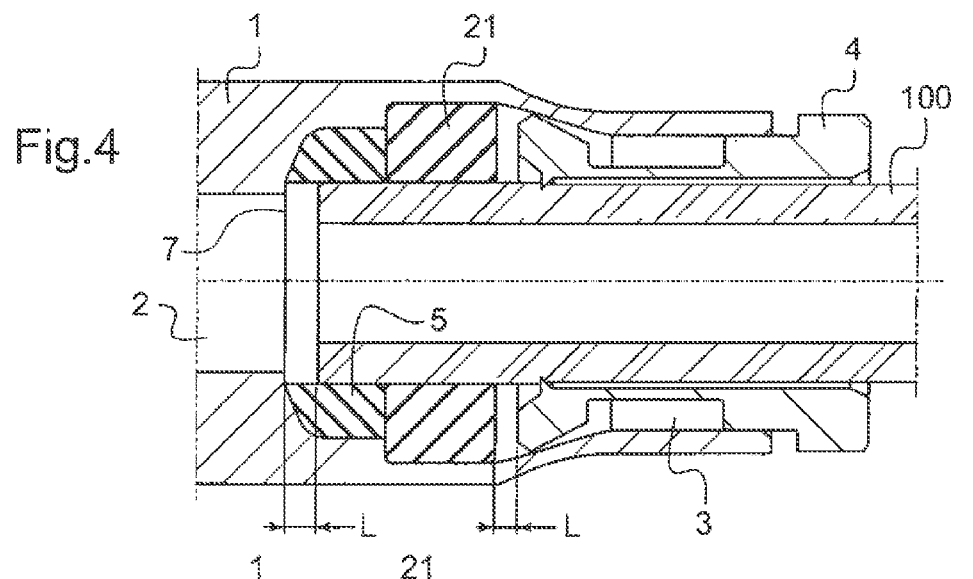
FIG. 4 is longitudinal cross-sectional view showing the coupling of FIG. 3 after pressurizing the circuit in which the coupling is installed.

In the second embodiment shown in FIGS. 2 to 4, the guide means 6 are formed by a bushing 21 fitted in the segment 3. By way of example, the bushing 21 is pushed into the segment 3 by force. The bushing 21 may also be crimped, adhesively bonded, blocked in position, or fastened by any other means suitable for preventing the bushing 21 from moving inside the segment 3. The bushing 21 has a polygonal inside surface defining a passage of section that is smaller than an outside section of the pipe end 100. The inside surface of the bushing 21 in this example has six flats within which there is inscribed a circle of diameter that is slightly smaller than the diameter of the pipe end 100.

The abutment 7 is here formed by a radial surface portion of annular shape that extends from the flank 9 of the groove 8.

The sealing member 5 is of a shape that is complementary to that of the groove 8 so as to fill it completely. Here the sealing member S has a cylindrical inside surface provided with an annular internal projection for locally exerting greater pressure on the pipe end 100, thereby locally reinforcing contact and thus sealing between the sealing member and the pipe end 100 without excessively increasing resistance to the pipe end being pushed into the sealing member.

As above, the pipe end 100 is coupled by being pushed into the segment 3 until it comes into contact with the abutment 7 (FIG. 3).

Pressurizing the circuit causes the pipe end 100 to reverse together with the locking member 4 until the locking member reaches its locking position. Reversing through a distance L leaves a space of the same length L between the abutment 7 and the terminal face of the pipe end 100 (FIG. 4). This space is shallow (because of the presence of the sealing member 5) and is easily washed during a cleaning operation that consists in causing a cleaning liquid to flow in the transport circuit.

Figure 5:
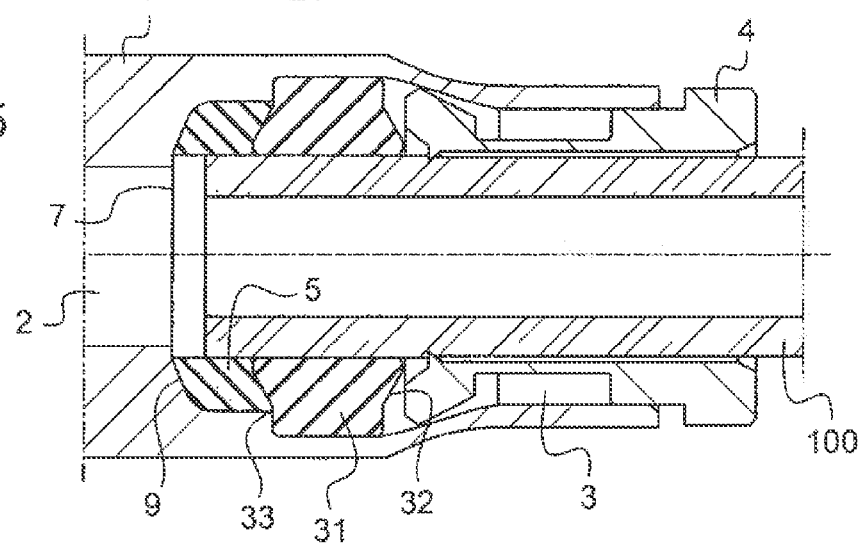
FIG. 5 is a longitudinal cross-sectional view of an alternative embodiment quick-connect coupling in accordance with the present invention.
Figure 6:
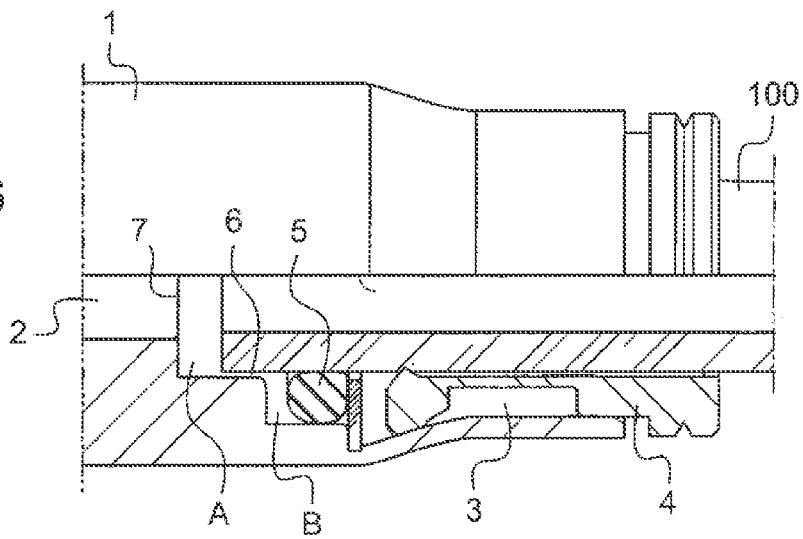
FIG. 6 is a longitudinal half cross-sectional view of a quick-connect coupling in accordance with the prior art.

In the third embodiment shown in FIG. 5, only the shape of the bushing of the guide means 6 is changed. The bushing 31 presents a first axial dimension and a second axial dimension respectively in the vicinity of an inner outline and of an outer outline of the bushing 31, the first axial dimension being longer than the second axial dimension in order to improve the guidance of the pipe end 100 without increasing the size of the bushing 31 in the vicinity of the wall of the body 1. The bushing 31 has two flanks 32 and 33 of frustoconical shape. The flank 32 is close to the free ends of the arms of the locking member 4. The free ends of the arms of the locking member 4 have inside surfaces of a shape that is complementary to the shape of the flank 32 such that the flank 32 maintains the locking member in its release state when the locking member 4 is pushed into its release position. This makes it easier for the operator to disconnect the pipe end.

Naturally, the invention is not limited to the embodiments described, but covers any variant coming within the field of the invention as defined by the claims.

In particular, the locking member may be a clamp, a deformable toothed washer, a latch that is movable radially, or any other system for retaining the pipe end in the reception segment, such as a split ring, for example.

In a variant, the second section of the body 1 may be identical to the first section such that the coupling device enables two pipe ends to be united with each other.

The invention is usable in any type of fluid transport circuit, and in particular for transporting food fluids or paints.

In a variant, the groove 8 possesses diverging flanks.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A coupling for connection to an end of a tube, the tube having an outer diameter, and the coupling comprising:
    a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
    a locking member for locking the tube end in the channel upon the tube end being received coaxially in the open end of the channel; and
    a generally annular seal member received in the groove, wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

2. The coupling of claim 1 further comprising a generally annular bushing fitted in the channel between the open end and the abutment surface, the bushing having an inner surface defining the guide surface.

3. The coupling of claim 1 wherein:
    the locking member is generally annular; and
    the tube end is receivable coaxially into the channel through the locking member.

4. The coupling of claim 3 wherein:
    the locking member is urgable towards the abutment surface to a release position to open about the tube outer diameter allowing the tubing to pass therethrough towards the abutment surface; and
    as the tube end is urged away from the abutment surface, the locking member is moved therewith away from the abutment surface to a locking position to close about the tube outer diameter delimiting further movement of the tube end out of the channel.

5. The coupling of claim 4 wherein the bushing has a generally frustoconical-shaped flank disposed facing the locking member, the locking member being held open in its release position by engagement with the flank.

6. A connection comprising:
    a tube having an end and an outer diameter;
    a coupling comprising:
        a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
        a locking member for locking the tube end in the channel upon the tube end being received coaxially in the open end of the channel; and
        a generally annular seal member received in the groove, wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

7. The connection of claim 6 further comprising a generally annular bushing fitted in the channel between the open end and the abutment surface, the bushing having an inner surface defining the guide surface.

8. The connection of claim 6 wherein:
    the locking member is generally annular; and the tube end is receivable coaxially into the channel through the locking member.

9. The connection of claim 8 wherein:
the locking member is urgable towards the abutment surface to a release position to open about the tube outer diameter allowing the tubing to pass therethrough towards the abutment surface; and
as the tube end is urged away from the abutment surface, the locking member is moved therewith away from the abutment surface to a locking position to close about the tube outer diameter delimiting further movement of the tube end out of the channel.

10. The connection of claim 6 wherein the bushing has a generally frustoconical-shaped flank disposed facing the locking member, the locking member being held open in its release position by engagement with the flank.

11. A coupling for connection to an end of a tube, the tube having an outer diameter, and the coupling comprising:
a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
a locking member for locking the tube end in the channel upon the tube end being received coaxially in the open end of the channel;
a generally annular seal member received in the groove; and
a generally annular bushing fitted in the channel between the open end and the abutment surface, the bushing having an inner surface defining the guide surface, the bushing inner surface having a generally polygonal-shaped cross-section defining a passageway smaller than the tube outer diameter,
wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

12. A connection comprising:
a tube having an end and an outer diameter;
a coupling comprising:
a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
a locking member for locking the tube end in the channel upon the tube end being received coaxially in the open end of the channel;
a generally annular seal member received in the groove; and
a generally annular bushing fitted in the channel between the open end and the abutment surface, the bushing having an inner surface defining the guide surface, the bushing inner surface having a generally polygonal-shaped cross-section defining a passageway smaller than the tube outer diameter,
wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

13. The connection of claim 12 wherein the bushing inner surface cross-section is generally hexagonal-shaped.

14. A coupling for connection to an end of a tube, the tube having an outer diameter, and the coupling comprising:
a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
a locking member for locking the tube end in the channel upon the tube end being received coaxially in the open end of the channel;
a generally annular seal member received in the groove; and
a generally annular bushing fitted in the channel between the open end and the abutment surface, the bushing having an inner surface defining the guide surface, and a radially inner first axial dimension and a radially outer second axial dimension, the first axial dimension being longer than the second axial dimension,
wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

15. The coupling of claim 14 wherein the bushing has a generally frustoconical-shaped flank disposed facing the locking member.

16. A coupling for connection to an end of a tube, the tube having an outer diameter, and the coupling comprising:
a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
a locking member for locking the tube end in the channel upon the tube end being received coaxially in the open end of the channel; and
a generally annular seal member received in the groove, substantially the entirety of the groove being filled by the seal member,
wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

17. The coupling of claim 16 wherein the seal member has a shape that is complementary to the shape of the groove.

18. The coupling of claim 17 wherein the groove has a flank which forms the abutment surface.

19. The coupling of claim 18 wherein a portion of the flank is generally frustoconical in shape.

20. A connection comprising:
a tube having an end and an outer diameter;
a coupling comprising:
   a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
   a locking member for locking the tube end in the channel upon the tube end being received coaxially in the open end of the channel;
   a generally annular seal member received in the groove; and
   a generally annular bushing fitted in the channel between the open end and the abutment surface, the bushing having an inner surface defining the guide surface, and a radially inner first axial dimension and a radially outer second axial dimension, the first axial dimension being longer than the second axial dimension
wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

21. The connection of claim 20 wherein the bushing has a generally frustoconical-shaped flank disposed facing the locking member.

22. A connection comprising:
a tube having an end and an outer diameter;
a coupling comprising:
   a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
   a locking member for locking the tube end in the channel upon the tube end being received coaxially in the open end of the channel; and
   a generally annular seal member received in the groove, substantially the entirety of the groove being filled by the seal member,
wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

23. The connection of claim 22 wherein the seal member has a shape that is complementary to the shape of the groove.

24. The connection of claim 23 wherein the groove has a flank which forms the abutment surface.

25. The connection of claim 24 wherein a portion of the flank is generally frustoconical in shape.

26. A coupling for connection to an end of a tube, the tube having an outer diameter, and the coupling comprising:
   a generally tubular body having a channel therethrough extending into the body from an open end towards an abutment surface, the body having a guide surface disposed between the open end and the abutment surface, and the channel having a generally annular groove formed as a step therein between the abutment surface and the guide surface, and the groove having an end wall defining the abutment surface;
   a locking member for locking the tube end in the channel upon the tube end being received coaxially in the open end of the channel;
   a generally annular seal member received in the groove; and
   a generally annular bushing fitted in the channel between the open end and the abutment surface, the bushing having an inner surface defining the guide surface, the bushing inner surface having a generally hexagonal-shaped cross-section defining a passageway smaller than the tube outer diameter,
wherein with the tube end being received coaxially into the channel, the tube end is moveable through the channel into an abutting engagement with the abutment surface with the tube outer diameter being supported by the guide surface and the seal member being received in a sealing engagement with the tube over the tube outer diameter.

* * * * *